(12) United States Patent
Li et al.

(10) Patent No.: US 11,363,317 B2
(45) Date of Patent: *Jun. 14, 2022

(54) INSERTING SECONDARY CONTENT INTO PRIMARY CONTENT PRESENTED BY AN ONLINE SYSTEM

(71) Applicant: META PLATFORMS, INC., Menlo Park, CA (US)

(72) Inventors: Shuo Li, Mountain View, CA (US); Eric Hsin-Chun Huang, Foster City, CA (US); Abhishek Bapna, Mountain View, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,186

(22) Filed: Sep. 30, 2020

(65) Prior Publication Data
US 2021/0014544 A1   Jan. 14, 2021

Related U.S. Application Data

(63) Continuation of application No. 15/839,616, filed on Dec. 12, 2017, now Pat. No. 10,834,437.

(51) Int. Cl.
*H04N 21/234* (2011.01)
*H04N 21/236* (2011.01)
(Continued)

(52) U.S. Cl.
CPC ....... *H04N 21/23424* (2013.01); *G06N 20/00* (2019.01); *H04N 21/251* (2013.01); *H04N 21/2547* (2013.01); *H04N 21/25891* (2013.01); *H04N 21/2668* (2013.01); *H04N 21/26241* (2013.01)

(58) Field of Classification Search
None
See application file for complete search history.

(56) References Cited

U.S. PATENT DOCUMENTS

| 8,079,054 | B1* | 12/2011 | Dhawan | ............ H04N 21/812 |
| | | | | 705/14.6 |
| 2014/0195329 | A1* | 7/2014 | Marcus | ............ G06Q 30/0242 |
| | | | | 705/14.71 |

(Continued)

*Primary Examiner* — Brian T Pendleton
*Assistant Examiner* — Jean D Saint Cyr
(74) *Attorney, Agent, or Firm* — Mannava & Kang, P.C.

(57) ABSTRACT

An online system receives a request for a video to be presented by the online system to a target user. The online system determines whether to insert secondary content into the video. For such a determination, the online system identifies a position in the video for inserting secondary content. Further, the online system determines a loss score and a gain score. The loss score measures a loss of interaction by the target user if the secondary content were inserted. The gain score includes a monetary compensation to be received by the online system for inserting the secondary content at the identified position. The online system compares the loss score and the gain score. Based on the gain score offsetting the loss score, the online systems modifies the video by inserting the secondary content at the identified position and provides the modified video for display to the target user.

20 Claims, 4 Drawing Sheets

(51) Int. Cl.
*H04N 21/25* (2011.01)
*H04N 21/466* (2011.01)
*H04N 21/475* (2011.01)
*H04N 21/258* (2011.01)
*H04N 21/2547* (2011.01)
*H04N 21/262* (2011.01)
*G06N 20/00* (2019.01)
*H04N 21/2668* (2011.01)

(56) References Cited

U.S. PATENT DOCUMENTS

| | | | | |
|---|---|---|---|---|
| 2015/0379569 A1* | 12/2015 | Li | ............... | G06Q 30/0256 |
| | | | | 705/14.52 |
| 2016/0189224 A1* | 6/2016 | Rao | ............... | G06Q 30/0275 |
| | | | | 705/14.27 |
| 2017/0257678 A1* | 9/2017 | Neumann | ......... | H04L 65/4084 |

\* cited by examiner

INSERTING SECONDARY CONTENT INTO PRIMARY CONTENT PRESENTED BY AN ONLINE SYSTEM

PRIORITY

This application is a Continuation of commonly assigned and co-pending U.S. patent application Ser. No. 15/839,616, filed Dec. 12, 2017, the disclosure of which is hereby incorporated by reference in its entirety.

BACKGROUND

This disclosure relates generally to online video delivery systems and, in particular, to inserting secondary content into primary video content presented by an online system to its users.

Online systems have become increasingly prevalent in digital content distribution and consumption, and allow users to more easily communicate with one another. Users of an online system associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

An online system stores videos and other types of media files, such as audio files, pictures, documents, etc., for presenting to users of the online system. These media files can be created by the online system, uploaded by online system users, or received from third parties. Online system users may interact with media files presented to them in various ways. For example, an online system user may play, express preference, comment on, share, hide or leave videos presented to them. An online system user can also decide what media files to share with other users connected to the user at the online system, e.g., through a newsfeed of the user.

Third parties have attempted to leverage online systems' presentation of media files by inserting content of their interest (secondary content as to the media files) into the media files so that the online system can present the secondary content along with the media files to online system users. For example, a third party may compensate an online system for inserting an introduction of its product, service, or brand to a video requested by an online system user. However, inserting the introduction may cause loss of interest of the online system user in the video itself. Current methods of inserting secondary content have drawback of failing to take into account potential gain and loss to an online system if secondary content were to be inserted into media files presented by the online system to a user. Potential gain can be increased quality of user experience or engagement (e.g., because the secondary content is of high quality and is relevant to the video) and/or compensation. Potential loss can be decreased user engagement, e.g., if the secondary content causes the user to stop watching the video.

SUMMARY

An online system provides primary content items for presentation to a target user and can modifying a primary content item by inserting secondary content to the primary content item at a particular position within the primary content. The primary content items are, for example, audio or video, and the secondary content may also include audio and or video content, and inserting the secondary content into the primary content may interrupt the playback of the primary content. The online system therefore determines whether to insert the secondary content to the primary content item at the particular position based on a gain score and a loss score associated with inserting the secondary content at the particular positon. The gain score and loss score can be determined based on machine learning techniques for predicting user behavior.

An example of a primary content item is a video file or stream. The online system receives a request, e.g., from a target user, for a video. Before or during presentation of the video to the target user, the online system determines whether to insert secondary content into the video. For such a determination, the online system identifies a candidate position in the video at which the secondary content can be inserted. The identification of the position can be based on a specification of the positon provided by a provider of the video. Alternatively, the online system selects the position based on a timing criterion, a content criterion, or a combination of both. Under the timing criterion, the identified position is at least a minimum amount of play time after the beginning of the video. Alternatively, the identified positions is at least a minimum amount of play time away from another position where secondary content is inserted, so as to put a limit on the amount of interruptions of the primary content are allowed. Under the content criterion, the identified position is a position that if the secondary content were inserted at the position, continuity of content of the video will not be impaired.

The online system determines a loss score and gain score for inserting the secondary content at the identified positon. The loss score indicates a loss of interaction by the target user if the secondary content were inserted at the identified position. For example, the user may stop watching the content altogether, or may even stop using the online system, if the secondary content were inserted. In some embodiments, the online system inputs a set of characteristics of the target user into a machine learning model. The machine learning model outputs a probability of the loss of interaction. The online system determines the loss score based on this probability. The gain score is computed based on a benefit to the system for inserting the secondary content, which may include both a monetary component and an organic component. The monetary component may be computed based on a compensation to be received by the online system if the secondary content were inserted at the identified position. The organic component indicates an increase in interaction by the target user if the secondary content were inserted at the identified position. The online system can use machine learning techniques to obtain a probability of the increase in interaction and then determine the organic score based on this probability.

After the loss score and gain score are determined, the online system compares the two scores. If the gain score offsets the loss score, the online system determines to insert the secondary content at the identified position and modifies the video accordingly. The modified video is provided for display to a client device of the target user so that the secondary content is provided to the target user along with the video. If the gain score does not offset the loss score, the online system may reevaluate inserting the secondary content at a later time position in the primary content, or it may repeat this same process from a different item of secondary content.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
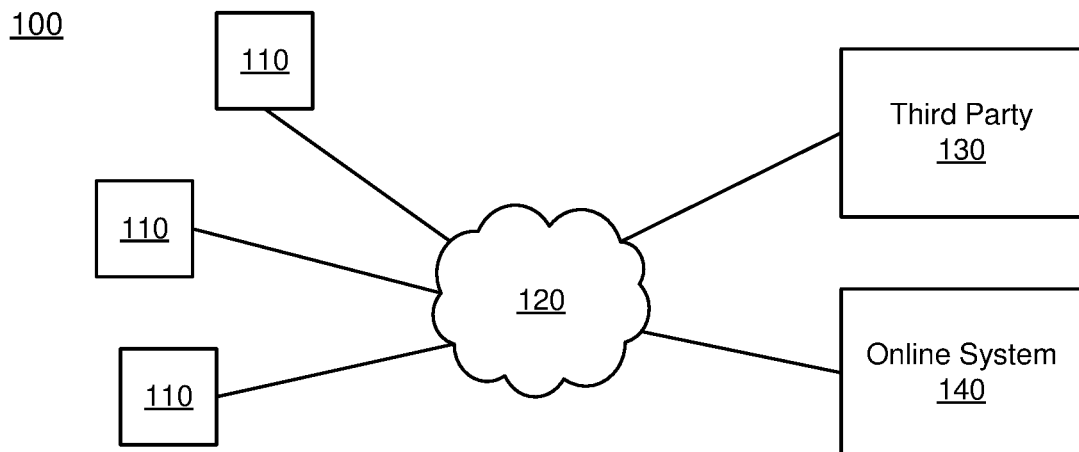
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, a client device 110 executes a software module that plays videos. The software module allows the user to play, pause, or leave a video.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

For example, a third party system 130 provides primary content for presentation by the online system 140 to a client device 110. As another example, a third party system 130 provides secondary content to be inserted into primary content presented by the online system 140 to a client device 110. Example primary and secondary content includes video, audio, music, text, images, or any combination thereof. In some embodiment, secondary content includes advertisements, e.g., for advertising a brand, product, or service associated with the third party system 130. The third party system 130 may compensate the online system 140 for inserting the secondary content into the primary content. More details regarding primary content and secondary content are described in conjunction with FIG. 2.

Figure 2:
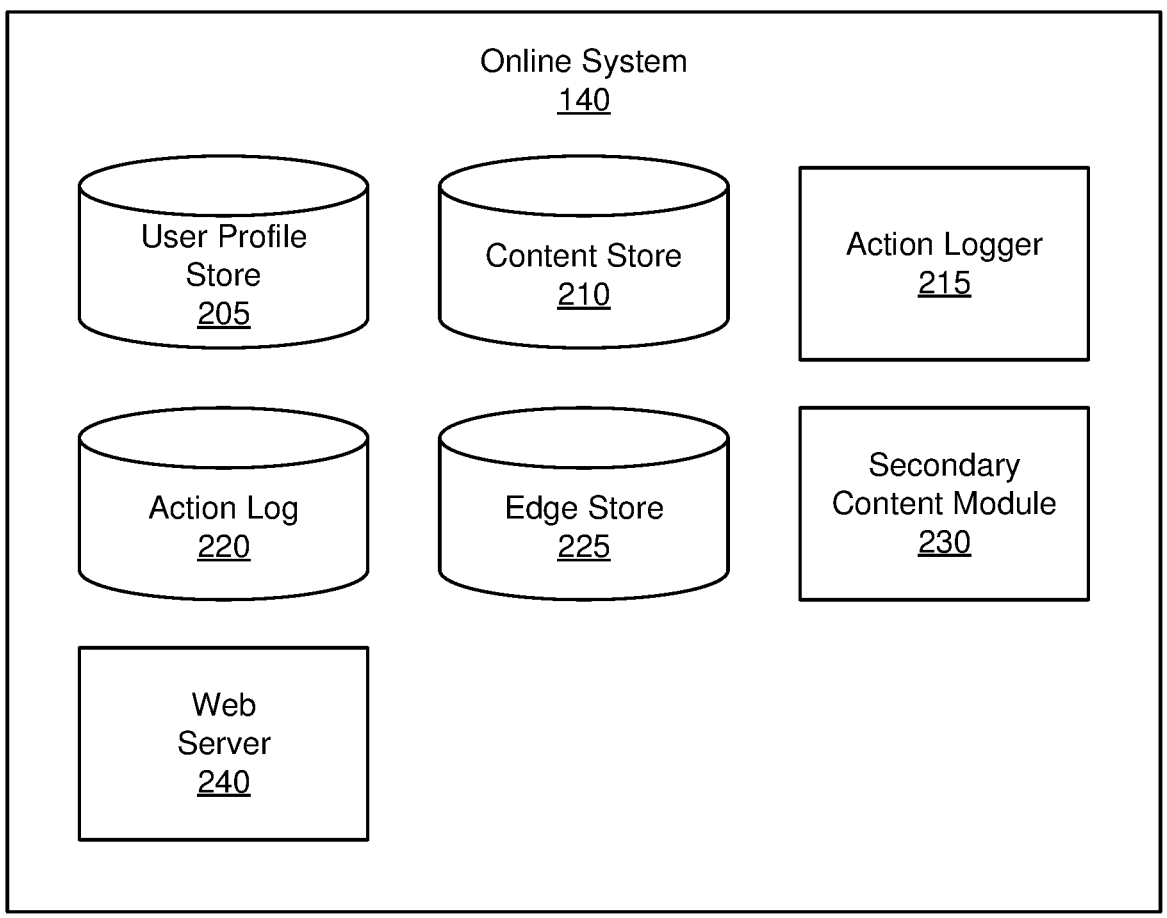
FIG. 2 is a block diagram of an online system in which a secondary content module operates, in accordance with an embodiment.

FIG. 2 is a block diagram of the online system 140 in which a secondary content module 230 operates. The online system 140 shown in FIG. 2 includes a user profile store 205, a content store 210, an action logger 215, an action log 220, an edge store 225, a secondary content module 230, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The content store 210 stores primary content items for presentation to a user. Also, the content store 210 stores secondary content items for inserting into primary content items and for presentation to a user along with the primary content items. Content of a secondary content item can be text, image, audio, video, or any other suitable data presented to a user. In various embodiments, the content of a secondary content item also specifies a page of content. For example, a secondary content item includes a landing page specifying a network address of a page of content to which a user is directed when the secondary content item is accessed.

In some embodiments, a secondary content item is associated with a bid amount. The bid amount is included in the secondary content item by a user and is used to determine an expected value, such as monetary compensation, provided by an advertiser to the online system 140 if content in the secondary content item is presented to a user, if the content in the secondary content item receives a user interaction when presented, or if any suitable condition is satisfied when content in the secondary content item is presented to a user. For example, the bid amount included in a secondary content item specifies a monetary amount that the online system 140 receives from a user who provided the secondary content item to the online system 140 if content in the secondary content item is displayed. In some embodiments, the expected value to the online system 140 of presenting the content from the secondary content item may be determined by multiplying the bid amount by a probability of the content of the secondary content item being accessed by a user.

In various embodiments, a secondary content item includes various components capable of being identified and retrieved by the online system 140. Example components of a secondary content item include: a title, text data, image data, audio data, video data, a landing page, a user associated with the content item, or any other suitable information. The online system 140 may retrieve one or more specific components of a secondary content item for inserting to a primary content item in some embodiments. For example, the online system 140 may identify a title and an image from a secondary content item and insert the title and the image to the primary content item rather than the secondary content item in its entirety.

Various secondary content items may include an objective identifying an interaction that a user associated with a secondary content item desires other users to perform when presented with content included in the secondary content item. Example objectives include: installing an application associated with a secondary content item, indicating a preference for a secondary content item, sharing a secondary content item with other users, interacting with an object associated with a secondary content item, or performing any other suitable interaction. As content from a secondary content item is presented to online system users along with a primary content item, the online system 140 logs interactions between users presented with the secondary content item or with objects associated with the secondary content item. Additionally, the online system 140 receives compensation from a user associated with a secondary content item as online system users perform interactions with a secondary content item that satisfy the objective included in the secondary content item.

Additionally, a secondary content item may include one or more targeting criteria specified by the user who provided the secondary content item to the online system 140. Targeting criteria included in a secondary content item request specify one or more characteristics of users eligible to be presented with the secondary content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The secondary content module 230 determines whether to modify a primary content item to be presented to a target user by inserting secondary content to the primary content item. For purpose of illustration and simplification, the following description uses video as content of an example primary content item. But a primary content item can include other types of content, such as audio, images, text, and so on. For example, the secondary content module 230 receives a request for the video from the target user. An example request is the target user's clicking of a URL (Uniform Resource Locator) associated with the video. Before or during presentation of the video to the target user, the online system determines whether to insert secondary content to the video. The video and the secondary content can be provided by different sources. For example, the video is a record of a basketball game provided by NBA, while the secondary content is an introduction of shoes provided by NIKE.

Adding the secondary content can cause gain and loss to the online system 140. On the one hand, the target user may decide not to interact with the video due to the insertion of the secondary content. For example, because of interruption of the basketball game by the air shoe introduction, the target user decides to stop watching the basketball game. On the other hand, the target user may decide to involve in more interaction with the video because of the insertion of the secondary content. For example, the target user is interested in air shoes and the air shoe introduction makes the video more informative and interesting to the user. The user may even decide to share the video with his friends who share his or her interest in air shoes. Also, the online system 140 may receive compensation from a provider of the secondary content by adding the secondary content to the video.

To determine whether to modify the video by inserting the secondary content, the secondary content module 230 identifies a position in the video for inserting the secondary content. The identification can be based on a specification of the video from the source/provider of the video. For example, NBA can specifies candidate positions where secondary content can be inserted into the basketball game video. Alternatively, the identification can be determined by the online system 140, e.g., the secondary content module 230 or an operator of the online system 140.

After the position for inserting the secondary content is identified, the secondary content module 230 determines a loss score indicating a loss of interaction by the target user if the secondary content were inserted at the identified position. The secondary content module 230 also determines a gain score if the secondary content were inserted at the identified position. The gain score includes a value to the online system of inserting the secondary content is inserted at the identified position. For example, the monetary component is a monetary compensation (e.g., a bid amount) provided by the third-part entity who provides the secondary content. In some embodiments, the gain score also includes an organic component indicating a gain of interaction by the target user if the secondary content were inserted at the identified position. The secondary content module 230 compares the loss score with the gain score. Based on the gain score offsetting the loss score, the secondary content module 230 determines to insert the secondary content is inserted at the identified position. In some embodiments, the secondary content module 230 determines the loss score and gain score based on machine learning techniques. The secondary content module 230 further modifies the video by inserting the secondary content to the video at the identified position and provides the modified video for display to a client device of the target user.

In some embodiments, the secondary content module 230 can identify multiple positions in the video and determines whether to insert secondary content at each of the identified position. More details about the secondary content module 230 are described in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Secondary Content Insertion

Figure 3:
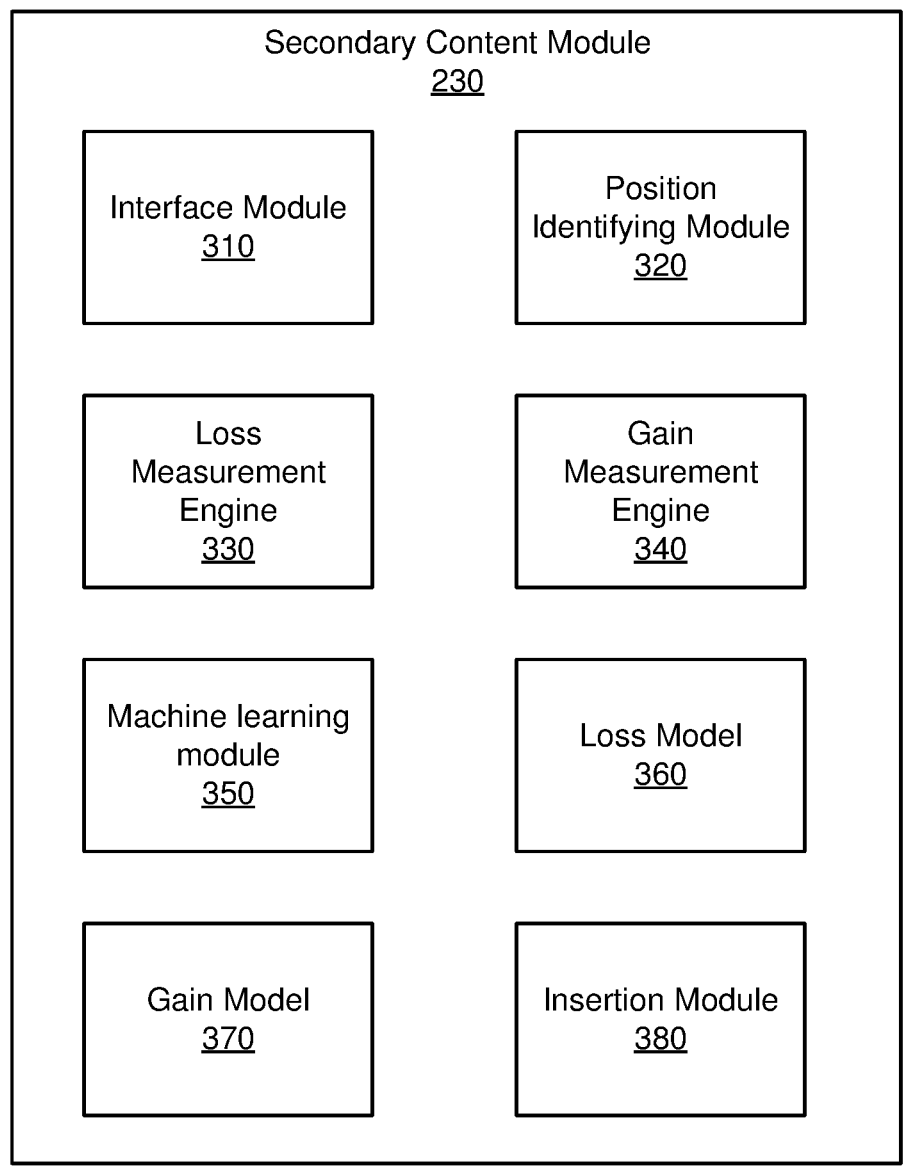
FIG. 3 is a block diagram of the secondary content module, in accordance with an embodiment.

FIG. 3 is a block diagram of the secondary content module 230, in accordance with an embodiment. The secondary content module 230 in the embodiment of FIG. 3 includes an interface module 310, a position identifying module 320, a loss measurement engine 330, a gain measurement engine 340, a machine learning module 350, a loss model 360, a gain model 370, and an insertion module 380. In other embodiments, the secondary content module 230 may include additional, fewer, or different components for various applications.

The interface module 310 facilitates communication of the secondary content module 230 with other entities. For example, the interface module 310 receives a video to be presented by the online system 140 to a target user. Also, the interface module 310 receives secondary content for inserting into the video. In some embodiments, the interface module 310 receives the video and secondary content from the web server 240. The interface module 310 can further sends the video and secondary content to the other components of the secondary content module 230 for identifying a position where the secondary content is added to the video and determining whether to modify the video by adding the secondary content at the identified position.

The position identifying module 320 identifies a position in the video for inserting the secondary content. In some embodiments, the position identifying module 320 identifies the position based on information specified by a provider of the video. Taking a video of a basketball game provided by NBA for example, NBA provides a specification of a position in the video where secondary content can be inserted. The interface module 310 can receive the specification from NBA and send the specification to the position identifying module 320. The position identifying module 320 identifies the specified position as the position for inserting the secondary content. In some instances, multiple positions are specified by the video's provider. The position identifying module 320 may identify all the specified positions as positions for inserting the secondary content. Alternatively, the position identifying module 320 selects one of the specified positions as the position for inserting the secondary content and makes the other specified positions available for inserting different secondary content.

In some other embodiments, the position identifying module 320 may not receive any position specification from the video's provider but the position identifying module 320 sets up one or more criteria for identifying a position in the video for inserting the secondary content. One criterion is based on play time. The position identifying module 320 determines a minimum amount of play time of the video before the secondary content can be inserted so that the secondary content will not be presented to the target user until the video has been played for at least the minimum amount of play time. The position identifying module 320 then determines an amount of play time of the video before the identified position and the amount of play time is no less than the minimum amount of play time.

Additionally or alternatively, the position identifying module 320 determines a minimum frequency of positions for inserting secondary content so that the target user will not see secondary content too often. One example is that the position identifying module 320 determines a minimum time gap between the position for inserting the secondary content and another position in the video where the same or different secondary content is inserted. The other position may be before or after the position for inserting the secondary content. The position identifying module 320 determines an amount of play time between the identified position and the other position and the amount of play time is no less than the minimum time gap.

Another criterion for identifying a position is based on content of the video. Generally, the criterion is to avoid impairing continuity of the content of the video. In one example, the position identifying module 320 analyzes the video to divide the video into multiple segments, e.g., based on detected scene changes within frames of the video. The position identifying module 320 identifies positions between the segments and selects one of the positions as the position for inserting the secondary content.

In one embodiment, the position identifying module 320 may randomly identify a position for other components of the secondary content module 230 to determine whether to insert the secondary content at the position.

The loss measurement engine 330 determines a loss score. The loss score indicates a loss of interaction with the video by the target user if the secondary content were inserted at the identified position. In some embodiments, the loss measurement 330 determines a probability of the loss of interaction and then determines the loss score based on the probability. For example, the loss score can be a product of the probability and a weight of the interaction with video by the target user. The weight can be determined by an operator of the online system 140.

The loss measurement engine 330 uses the loss model 360 trained by the machine learning module 350 to determine the probability of the loss of interaction. The machine learning module 350 applies machine learning techniques to train the loss model 360. When applied to the target user, the loss model 360 outputs a probability of whether the target user would have not interacted with the video if the secondary content were inserted to the video at the identified position. In one embodiment, the probability output from the loss model 360 is a percentage from 0% to 100%. The probability output from the loss model 360 can be in other forms.

As part of the training of the loss model 360, the machine learning module 350 forms a training set of online system users. In some embodiments, the training set includes a positive training set of online system users that have been determined to not interact with the video after the secondary content is added to the video at the identified position and a negative training set of online system users that have been determined to still interact with the video after the secondary content is added to the video at the identified position. In one embodiment, the online system users in the training set may be selected based on at least in part on the demographic information or other types of description information of the online system users.

The machine learning module 350 extracts feature values from the online system users of the training set, the features being variables deemed potentially relevant to whether or not the online system users have been determined to not interact with the video after the secondary content is added to the video at the identified position. Specifically, the feature extracted by the machine learning module 350 include features associated with both explicit and implicit characteristics of the online system users. Explicit characteristics can be included in user profiles. Example explicit characteristics include hobbies, preferences, age, work experience, educational history, gender, location, or other information provided by an online system user, such as images or videos. Implicit characteristics can be indicated in user actions. Online system users are showing implicit characteristics every time they interact with a content item or a connection, such as a user's historical interaction with videos or secondary content items inserted to videos. The explicit and implicit characteristics from the online system users can be retrieved from the user profile store 205 and the action log 220, respectively.

The machine learning module 350 uses machine learning to train the loss model 360, with the feature vectors of the positive training set and in some embodiments, the negative training set serving as the inputs. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

In some embodiments, a validation set is formed of additional online system users, other than those in the training sets, which have already been determined to have or to lack the property in question. The machine learning module 350 applies the trained validation model to the online system users of the validation set to quantify the accuracy of the loss model 360. Common metrics applied in accuracy measurement include: Precision=TP/(TP+FP) and Recall=TP/(TP+FN), where precision is how many outcomes the loss model 360 correctly predicted (TP or true positives) out of the total it predicted (TP+FP or false positives), and recall is how many outcomes the loss model 360 correctly predicted (TP) out of the total number of online system users that did not interact with the video after the secondary content is added to the video at the identified position (TP+FN or false negatives). The F score (F-score=2*PR/(P+R)) unifies precision and recall into a single measure. In one embodiment, the machine learning module 350 iteratively re-trains the loss model 360 until the occurrence of a stopping condition, such as the accuracy measurement indication that the model is sufficiently accurate, or a number of training rounds having taken place.

In some embodiments, the loss score indicates an aggregation of losses of different types of interaction. Each type of interaction is associated with an interaction loss score that indicates a loss of the type of interaction by the target user if the secondary content were inserted to the video at the identified position. For example, the loss measurement engine 330 identifies a plurality of types of interaction that the target user could make with the video. Example types of interaction includes playing, liking, sharing, commenting on, other types of interaction, or any combination thereof. For each identified type of interaction, the loss measurement engine 330 determines an interaction loss score. In one embodiment, an interaction loss score is a product of a weight of the corresponding type of interaction and a probability of a loss of the type of interaction. The loss score is an aggregation (e.g., a sum) of the interaction loss scores of all the identified types of interaction.

In one instance, the loss measurement engine 330 uses a single machine learning model trained for determining a probability of a loss of each type of interaction. In another instance, the loss measurement engine 330 uses a different machine learning model trained for determining a probability of a loss of a different type of interaction. In either instance, a machine learning model can be trained by using the machine learning techniques described above.

The gain measurement engine 340 determines a gain score indicating a gain to the online system 140 if the secondary content were inserted at the identified position. The gain score includes a value to the online system for inserting the secondary content at the identified position. For example, the gain score includes a monetary component that represents a monetary compensation received by the online system 140 from a provider of the secondary content if the secondary content is presented to the target user. An example monetary component is a bid amount associated with the secondary content. The gain measurement engine 340 may further apply a conversion factor to the monetary component and convert the monetary component to the gain score, so that the gain score has the same unit of measurement as the loss score. Alternatively, a conversion factor may be applied to the loss score so that the loss score having the same unit of measurement as the monetary component.

In addition or alternative to the monetary component, the gain score can include an organic component. The organic component indicates a gain of interaction by the target user if the secondary content were inserted to the video at the identified position. In some embodiments, the gain measurement 340 determines a probability of the gain of interaction and then determines the organic component of gain score based on the probability. For example, the organic component can be a product of the probability and a weight of the interaction with video by the target user. The weight can be determined by an operator of the online system 140.

The gain measurement module 340 uses the gain model 370 trained by the machine learning module 350 to determine the probability of the gain of interaction. When applied to the target user, the gain model 370 outputs a probability of whether the target user would have interacted with the video because of insertion of the secondary content to the video at the identified position. In one embodiment, the probability output from the gain model 370 is a percentage from 0% to 100%. The probability output from the gain model 370 can be in other forms. Training of the gain model 370 by the machine learning module 350 can be similar to training of the loss model 360 described above.

In some embodiments, the organic component indicates an aggregation of gains of different types of interaction. Each type of interaction is associated with an interaction gain score that indicates a gain of the type of interaction by the target user due to insertion of the secondary content. For example, the gain measurement engine 340 identifies a plurality of types of interaction that the target user could make with the video. For each identified type of interaction, the gain measurement engine 340 determines an interaction gain score. In one embodiment, an interaction gain score is a product of a weight of the corresponding type of interaction and a probability of a gain of the type of interaction. The organic component of the gain score is an aggregation (e.g., a sum) of the interaction gain scores of all the identified types of interaction. In one instance, the gain measurement module 340 uses a single machine learning model trained for determining a probability of a gain of each type of interaction. In another instance, the gain measurement module 340 uses a different machine learning model trained for determining a probability of a gain of a different type of interaction. In either instance, a machine learning model can be trained by using the machine learning technique described above.

In some embodiments, the gain score is an aggregation of the monetary component and the organic component. For example, the gain score (G) is the sum of the organic component (OC) and the monetary component (MC) multiplied by the conversion factor (CT). Expressed as a formula this equates to:

$$G=OC+CF\times MC.$$

In this example, the conversion factor converts the monetary component into the same unit as the organic component.

The insertion module 380 determines whether to insert the secondary content to the video at the identified position. For example, the insertion module 380 determines whether the gain score offsets the loss score, e.g., by comparing the loss score with the gain score. In some embodiments, the gain score offsets the loss score when the gain score is the same as or larger than the loss score. In some other embodiments, the gain score offsets the loss score when a net gain/loss is above a threshold. The threshold can be negative, indicating a net loss (e.g., the gain score is smaller than the loss score). After determining that the gain score offsets the loss score, the insertion module 380 determines to insert the secondary content to the video at the identified position. After determining that the loss score offsets the gain score, the insertion module 380 determines not to insert the secondary content to the video. In instances where the loss score equals the gain score, the insertion module 380 may determine to insert the secondary content to the video at the identified position.

Based on a determination of inserting the secondary content, the insertion module 380 modifies the video by inserting the secondary content to the video at the identified position. The modified video is provided, e.g., through the interface module 310 and the web server 240, for display to a client device 110 of the target user.

In some embodiments, the determination of inserting the secondary content and modification of the video occur after the target user has started to play the video. The target user may not be aware of the insertion of the secondary content until the secondary content is presented to the target user. Alternatively, when the insertion module 380 modifies the video or when play of the video approaches the identified position, the insertion module 380 may send a message to the target user to notify the target user of the insertion of the secondary content.

The embodiment of FIG. 3 includes one position in the video where the secondary content is inserted. In other embodiments, the secondary content module 230 may identify a plurality of positions for inserting secondary content in a video. The secondary content module 230 can determine to insert secondary content at multiple positions, each of which has a gain score offsetting its loss score.

Figure 4:
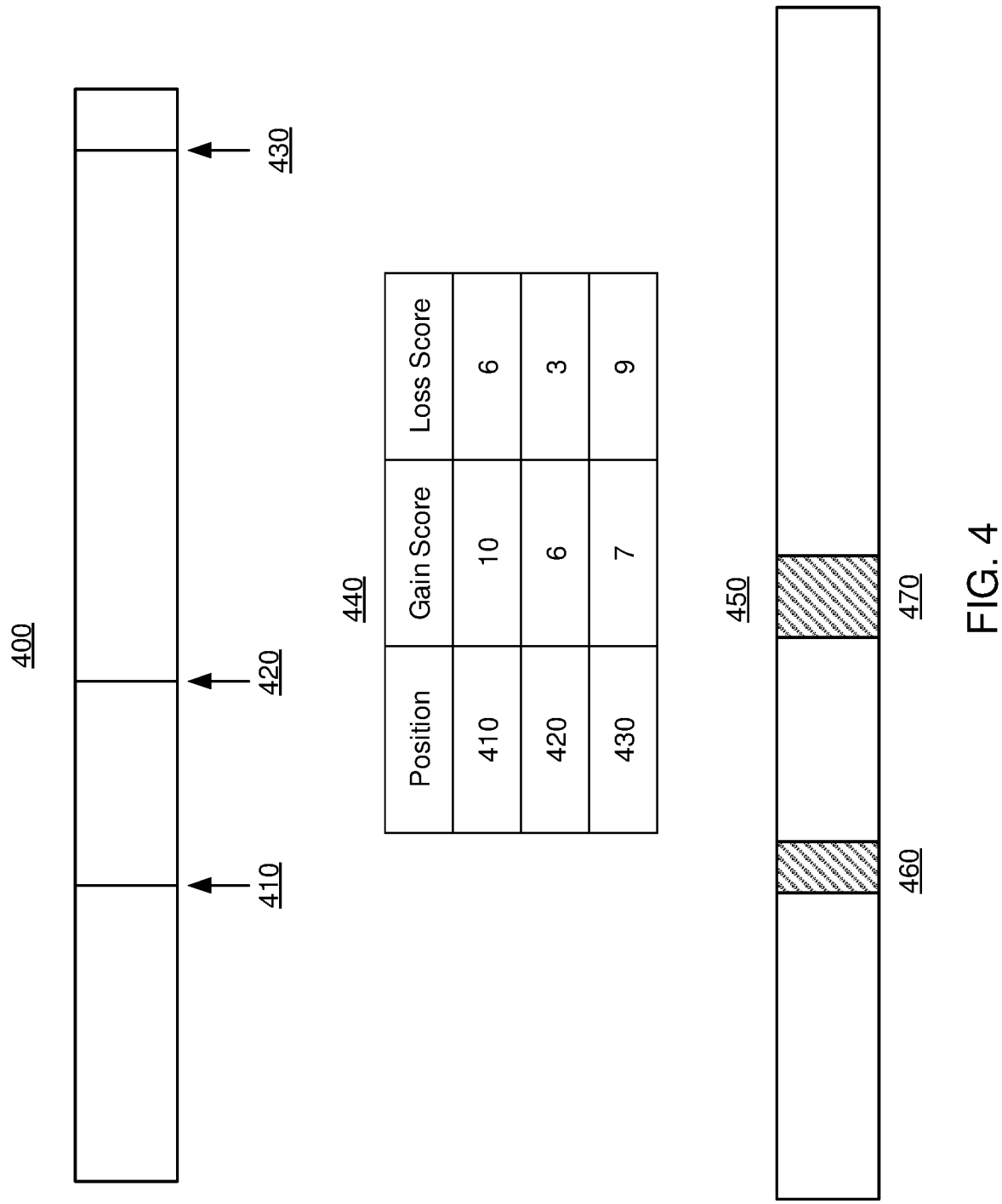
FIG. 4 illustrates an example of inserting secondary content to a video at a plurality of positions, in accordance with an embodiment.

FIG. 4 illustrates an example of inserting secondary content to a video at a plurality of positions, in accordance with an embodiment. As shown in FIG. 4, three positions 410, 420, and 430 are identified in the video 400. Table 440 lists a gain score and loss score for each position. The position 410 has a gain score offsetting its loss score. Similarly, the position 420 also has a gain score offsetting its loss score. However, the position 430 has a loss score offsetting its gain score. Accordingly, secondary content 460 is inserted at the position 410 and secondary content 470 is inserted at the position 420, as shown in a modified video 450. In the embodiment of FIG. 4, the secondary content 460 and the secondary content 470 are different, shown by difference in their length. In other embodiments, same secondary content can be inserted at the positions 410 and 420.

Also, the secondary content module 230 may rank the positions 410 and 420 and select one of them to insert secondary content. One way to rank the positions 410 and 420 is based on their gain scores. A position having a higher gain score (i.e., the position 410) is ranked higher. Another way to rank is based on loss scores of the positions 410 and 420. A position having a lower gain score (i.e., the position 420) is ranked higher. Yet another way to rank is based on difference between a gain score and loss score of each position. For example, the position 410 is ranked higher because its gain score offsets its loss score by 4, versus the gain score of the position 420 offsets its loss score by 3.

Figure 5:
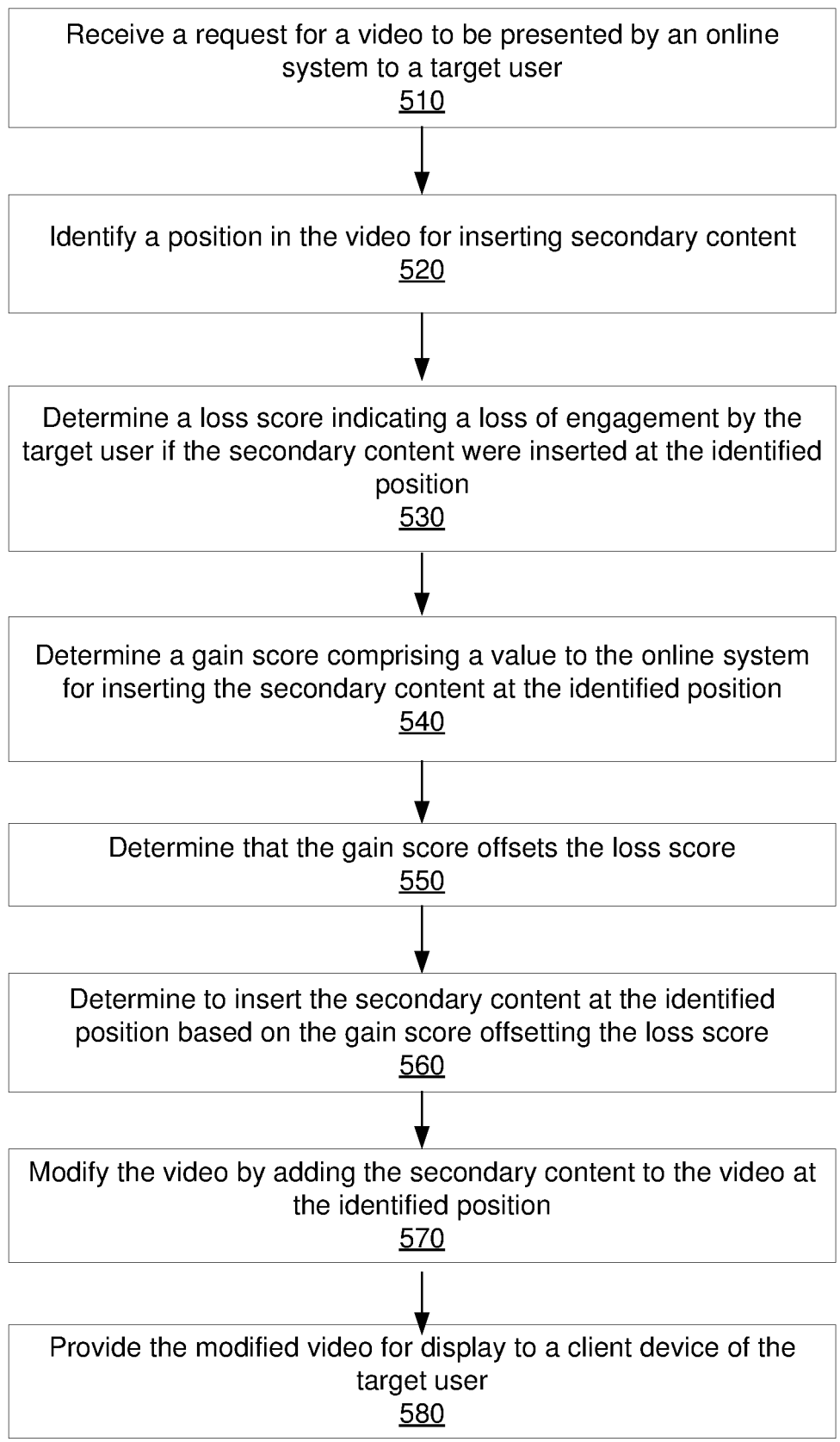
FIG. 5 is a flowchart illustrating a process of inserting secondary content to a video, in accordance with an embodiment.

FIG. 5 is a flowchart illustrating a process of inserting secondary content to a video, in accordance with an embodiment. In some embodiments, the process is performed by the secondary content module 230 of the online system 140, although some or all of the operations in the method may be performed by other entities in other embodiments. In some embodiments, the operations in the flow chart are performed in a different order and can include different and/or additional steps.

The secondary content module 230 receives 510 a request for a video to be presented by an online system to a target user. The request can be a selection of a URL associated with the video by the target user. In some embodiments, upon the request is received, the video is provided to a client device of the target user.

The secondary content module 230 identifies 520 a position in the video for inserting secondary content. The position may be specified by a source of the video. In some embodiments, the source of video specifies multiple positions in the video and the secondary content module 230 selects one of the positions as the position for inserting the secondary content. The positions may alternatively be determined by the secondary content module 230 based on a timing criterion. For example, the secondary content module 230 determines an amount of play time of the video before the identified position and the amount of time is at least a threshold amount of time. As another example, the secondary content module 230 determines an amount of play time of the video between the identified position and another position for inserting secondary content and the amount of time is at least a threshold amount of time.

The secondary content module 230 determines 530 a loss score indicating a loss of interaction by the target user if the secondary content were inserted at the identified position. The loss score can be an aggregation of interaction loss scores indicating losses of different types of interaction, such as loss of playing, loss of liking, loss of commenting on, loss of sharing, and so on. The secondary content module 230 can use a machine learning model to obtain a probability of the loss of each type of interaction and determine an interaction loss score for the type of interaction by multiplying the probably with a weight of the type of interaction. For example, the secondary content module 230 inputs a set of characteristics of the target user into a machine learning model and the machine learning model outputs a probability of the loss of a type of interaction.

The secondary content module 230 determines 540 a gain score comprising a value to the online system for inserting the secondary content at the identified position. The gain score includes a monetary component indicating a compensation to be received by the online system for inserting the secondary content at the identified position. In some embodiments, the gain score further includes an organic component. The organic component indicates a gain of interaction by the target user if the secondary content were inserted at the identified position. The secondary content module 230 can determine the organic component of the gain score based on machine learning techniques. The gain score is an aggregation of the monetary component and the organic component. The secondary content module 230 may convert the monetary component by using a conversion factor so that the gain score has a same unit as the loss score to facilitate comparison between the gain score and the loss score.

The secondary content module 230 determines 550 that the gain score offsets the loss score. The secondary content module 230 then determines 560 to insert the secondary content at the identified position based on the gain score offsetting the loss score. When the gain score does not offset the loss score, the secondary content module 230 determines not to insert the secondary content. But the secondary content module 230 may then identify another position and determine whether to insert the secondary content to the video at the other position.

The secondary content module 230 modifies 570 the video by adding the secondary content to the video at the identified position. The secondary content module 230 provides 580 the modified video for display to a client device of the target user. The secondary content module 230 may generate a message indicating the modification of the video and send the message to the client device of the target user. The message can be displayed when play of the video approaches the identified position.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system, comprising:
a processor; and
a memory storing instructions, which when executed, cause the processor to:
receive a request for content to be presented by a content management system to a user; and
determine a position within the content for inserting secondary content, wherein the position is determined by:
calculating a loss score based on at least one characteristic of the user, wherein the loss score is calculated using at least one computer machine learning technique to represent a predicted loss of interaction by the user in the event the secondary content is inserted in the determined position, and wherein calculating the loss score comprises:
identifying a type of user interaction from a plurality of types of user interactions; and
determining an interaction loss score for each identified type of user interaction from the plurality of types of user interactions, wherein the interaction loss score represents a loss of the identified type of interaction by the user if the secondary content were inserted at the identified position;
calculating a gain score based on at least a value to the content management system for inserting the secondary content within the content at the position, wherein the gain score is calculated using at least one computer machine learning technique to represent a predicted gain of interaction by the user in the event the secondary content is inserted in the determined position;
calculating an offset between the loss score and the gain score; and
determining the position to insert the secondary content within the content based on the calculated offset, the position being where the gain score is determined to offset the loss score.

2. The system of claim 1, wherein the content comprises interactive video media content and the content management system is an online content management system.

3. The system of claim 1, wherein the loss score represents a prediction of a decrease in engagement by the user with the online system in the event the secondary content is inserted at the position, the prediction based on at least one computer machine learning model that receives the characteristics of the user and calculates the loss score based on a probability of a loss of user interaction.

4. The system of claim 3, wherein calculating the loss score further comprises:
aggregating interaction loss scores for each type of user interaction for the plurality of types of user interactions; and
inputting the aggregated interaction loss scores into the at least one computer machine learning model to facilitate calculation of the probability of the loss of user interaction.

5. The system of claim 4, wherein the types of user interactions comprise viewing, clicking, playing, liking, commenting, and sharing.

6. The system of claim 1, wherein the gain score comprises:
a monetary component representing compensation to be received by the content management system for inserting the secondary content at the identified position; and
an organic component indicating a gain of interaction by the user in the event the secondary content was inserted at the identified position.

7. The system of claim 6, wherein the organic component of the gain score is determined by:
inputting a set of characteristics of the user and a set of characteristics of the secondary content into a computer machine learning model to determine a probability of gain of interaction by the user in the event the secondary content was inserted at the position; and
determining the organic component of the gain score based on the probability.

8. The system of claim 1, wherein determining the position within the content for inserting secondary content further comprises:
identifying a plurality of potential positions in the content for inserting secondary content;
calculating the gain score and the loss score for each of the identified potential positions;
ranking the potential positions based on the calculated gain scores and loss scores; and
determine the position based on the rankings of the potential positions.

9. A method, comprising:
receiving a request for content to be presented by a content management system to a user; and
determining a position within the content for inserting secondary content, wherein the position is determined by:
calculating a loss score based on at least one characteristic of the user, wherein the loss score is calculated using at least one computer machine learning technique to represent a predicted loss of interaction by the user in the event the secondary content is inserted in the determined position, and wherein calculating the loss score comprises:
identifying a type of user interaction from a plurality of types of user interactions; and
determining an interaction loss score for each identified type of user interaction from the plurality of types of user interactions, wherein the interaction loss score represents a loss of the identified type of interaction by the user if the secondary content were inserted at the identified position;
calculating a gain score based on at least a value to the content management system for inserting the secondary content within the content at the position, wherein the gain score is calculated using at least one computer machine learning technique to represent a predicted gain of interaction by the user in the event the secondary content is inserted in the determined position;

calculating an offset between the loss score and the gain score; and determining the position to insert the secondary content within the content based on the calculated offset, the position being where the gain score is determined to offset the loss score.

10. The method of claim 9, wherein the loss score represents a prediction of a decrease in engagement by the user with the online system in the event the secondary content is inserted at the position, the prediction based on at least one computer machine learning model that receives the characteristics of the user and calculates the loss score based on a probability of a loss of user interaction.

11. The method of claim 10, wherein calculating the loss score further comprises:

aggregating interaction loss scores for each type of user interaction for the plurality of types of user interactions; and inputting the aggregated interaction loss scores into the at least one computer machine learning model to facilitate calculation of the probability of the loss of user interaction.

12. The method of claim 11, wherein the types of user interactions comprise viewing, clicking, playing, liking, commenting, and sharing.

13. The method of claim 9, wherein the gain score comprises:

a monetary component representing compensation to be received by the content management system for inserting the secondary content at the identified position; and an organic component indicating a gain of interaction by the user in the event the secondary content was inserted at the identified position.

14. The method of claim 13, wherein the organic component of the gain score is determined by:

inputting a set of characteristics of the user and a set of characteristics of the secondary content into a computer machine learning model to determine a probability of gain of interaction by the user in the event the secondary content was inserted at the position; and determining the organic component of the gain score based on the probability.

15. A non-transitory computer readable medium storing an executable, which when executed by a processor, performs the following:

receiving a request for content to be presented by a content management system to a user; and determining a position within the content for inserting secondary content, wherein the position is determined by:

calculating a loss score based on at least one characteristic of the user, wherein the loss score is calculated using at least one computer machine learning technique to represent a predicted loss of interaction by the user in the event the secondary content is inserted in the determined position, and wherein calculating the loss score comprises:

identifying a type of user interaction from a plurality of types of user interactions; and determining an interaction loss score for each identified type of user interaction from the plurality of types of user interactions, wherein the interaction loss score represents a loss of the identified type of interaction by the user if the secondary content were inserted at the identified position;

calculating a gain score based on at least a value to the content management system for inserting the secondary content within the content at the position, wherein the gain score is calculated using at least one computer machine learning technique to represent a predicted gain of interaction by the user in the event the secondary content is inserted in the determined position;

calculating an offset between the loss score and the gain score; and determining the position to insert the secondary content within the content based on the calculated offset, the position being where the gain score is determined to offset the loss score.

16. The non-transitory computer readable medium of claim 15, wherein the loss score represents a prediction of a decrease in engagement by the user with the online system in the event the secondary content is inserted at the position, the prediction based on at least one computer machine learning model that receives the characteristics of the user and calculates the loss score based on a probability of a loss of user interaction.

17. The non-transitory computer readable medium of claim 16, wherein calculating the loss score further comprises:

aggregating interaction loss scores for each type of user interaction for the plurality of types of user interactions; and inputting the aggregated interaction loss scores into the at least one computer machine learning model to facilitate calculation of the probability of the loss of user interaction.

18. The non-transitory computer readable medium of claim 17, wherein the types of user interactions comprise viewing, clicking, playing, liking, commenting, and sharing.

19. The non-transitory computer readable medium of claim 15, wherein the gain score comprises:

a monetary component representing compensation to be received by the content management system for inserting the secondary content at the identified position; and an organic component indicating a gain of interaction by the user in the event the secondary content was inserted at the identified position.

20. The non-transitory computer readable medium of claim 19, wherein the organic component of the gain score is determined by:

inputting a set of characteristics of the user and a set of characteristics of the secondary content into a computer machine learning model to determine a probability of gain of interaction by the user in the event the secondary content was inserted at the position; and determining the organic component of the gain score based on the probability.

* * * * *